(12) United States Patent
Dighans

(10) Patent No.: US 7,520,523 B1
(45) Date of Patent: Apr. 21, 2009

(54) BICYCLE STUNT PEG APPARATUS

(76) Inventor: Dennis B. Dighans, 211 Bassett Dr., Colorado Springs, CO (US) 80910

(*) Notice: Subject to any disclaimer, the term of this patent is extended or adjusted under 35 U.S.C. 154(b) by 0 days.

(21) Appl. No.: 11/542,004

(22) Filed: Oct. 2, 2006

(51) Int. Cl.
*B62J 25/00* (2006.01)
(52) U.S. Cl. .................................. 280/291; 280/288.4
(58) Field of Classification Search ............. 280/288.4, 280/291, 293, 295, 296; 74/564
See application file for complete search history.

(56) References Cited

U.S. PATENT DOCUMENTS

| | | | |
|---|---|---|---|
| 3,484,829 A * | 12/1969 | Erickson | 280/291 |
| 3,918,323 A * | 11/1975 | Prager | 74/551.8 |
| 4,700,964 A * | 10/1987 | Hess | 280/288.4 |
| D354,934 S | 1/1995 | Johnson et al. | |
| 5,884,983 A | 3/1999 | Wu | |
| 5,984,528 A * | 11/1999 | Ohtsu | 384/545 |
| 6,199,887 B1 | 3/2001 | Lee | |
| 6,247,761 B1 | 6/2001 | Lin | |
| 6,485,044 B1 | 11/2002 | Blake | |
| 6,969,082 B2 * | 11/2005 | Griffin et al. | 280/291 |

* cited by examiner

Primary Examiner—Tony H. Winner

(57) ABSTRACT

A bicycle stunt peg apparatus includes a rod that has a first end and a second end. The first end has a threaded well extending therein. A threaded tire axle is extended into and is threadably coupled to the threaded well. The rod has a perimeter surface extending between the first and second ends. The perimeter surface has an annular groove therein that is bounded by enlarged portions of the rod. A bearing extends around and is rotatably mounted to the groove. The bearing is used for positioning on a railing while a bicycle is balanced on the railing with the peg.

9 Claims, 5 Drawing Sheets

BICYCLE STUNT PEG APPARATUS

BACKGROUND OF THE INVENTION

1. Field of the Invention

The present invention relates to bicycle stunt pegs and more particularly pertains to a new bicycle stunt peg for preventing damage to railings and walls when the peg is used for balancing a bicycle.

2. Description of the Prior Art

The use of bicycle stunt pegs is known in the prior art. While these devices fulfill their respective, particular objectives and requirements, the need remains for a device that allows a person to use bicycle pegs on public walls and railings without damaging the railings and walls.

SUMMARY OF THE INVENTION

The present invention meets the needs presented above by generally comprising a rod that has a first end and a second end. The first end has a threaded well extending therein. A threaded tire axle is extended into and is threadably coupled to the threaded well. The rod has a perimeter surface extending between the first and second ends. The perimeter surface has an annular groove therein that is bounded by enlarged portions of the rod. A bearing extends around and is rotatably mounted to the groove.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
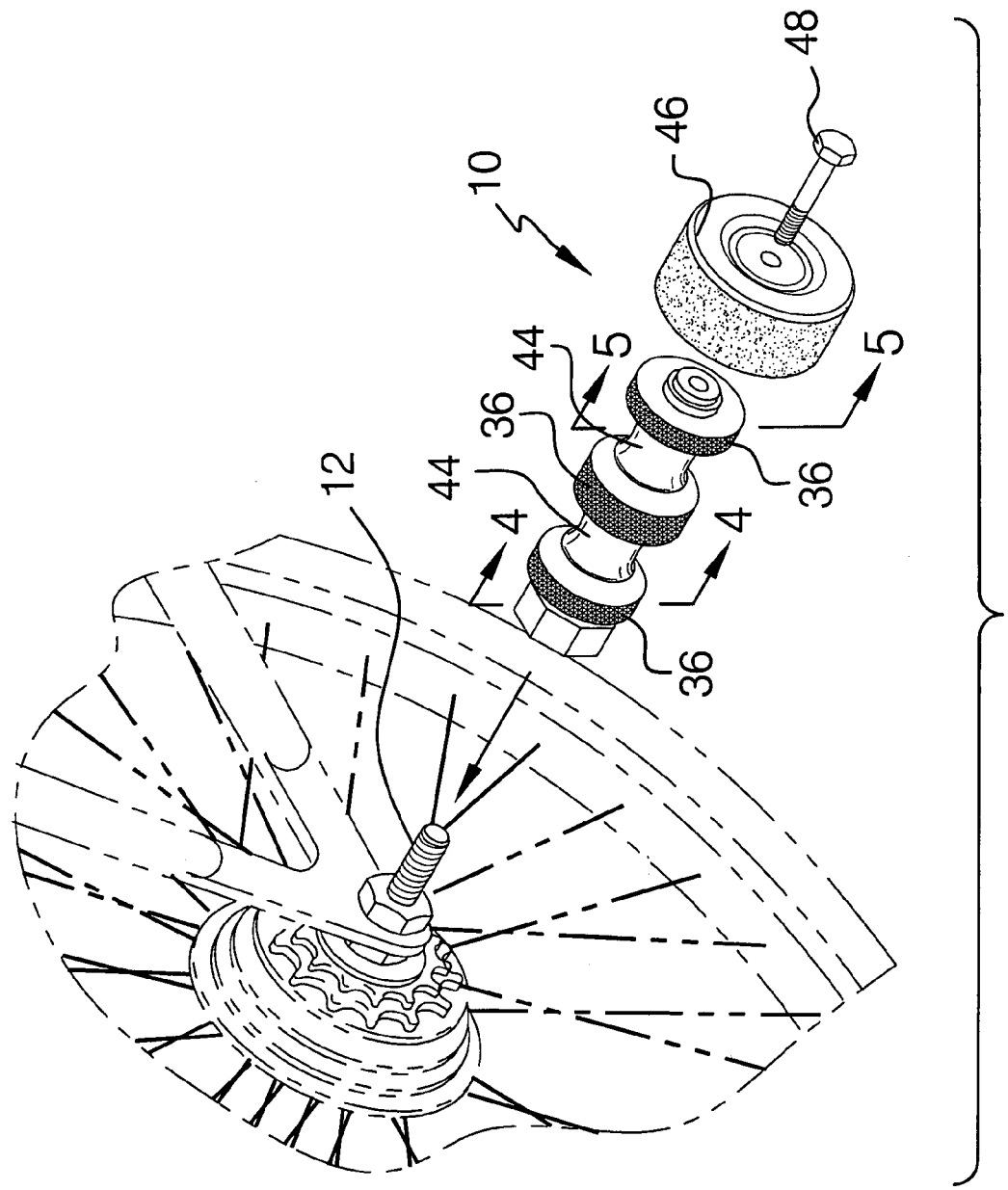
FIG. 1 is an expanded perspective view of a bicycle stunt peg apparatus according to the present invention.
Figure 2:
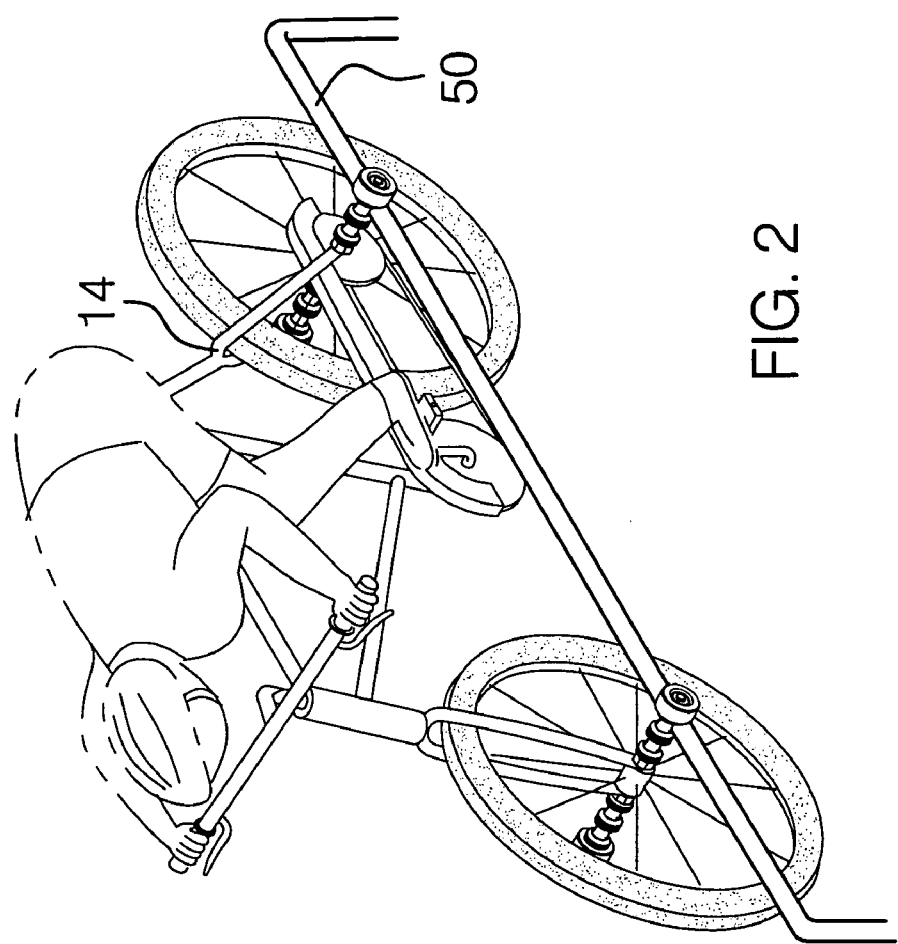
FIG. 2 is a perspective in-use view of the present invention.
Figure 3:
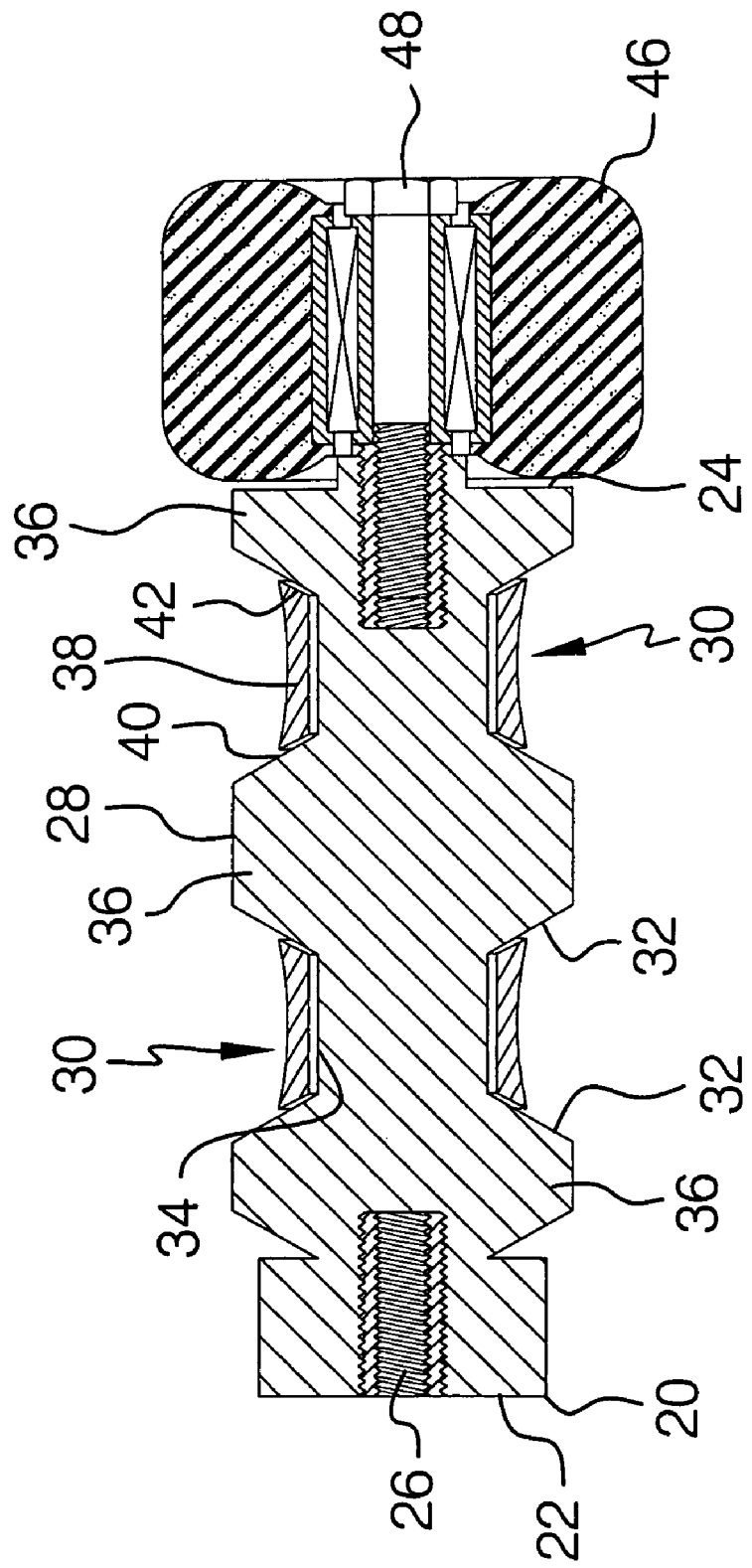
FIG. 3 is a side cross-sectional view of the present invention.
Figure 4:
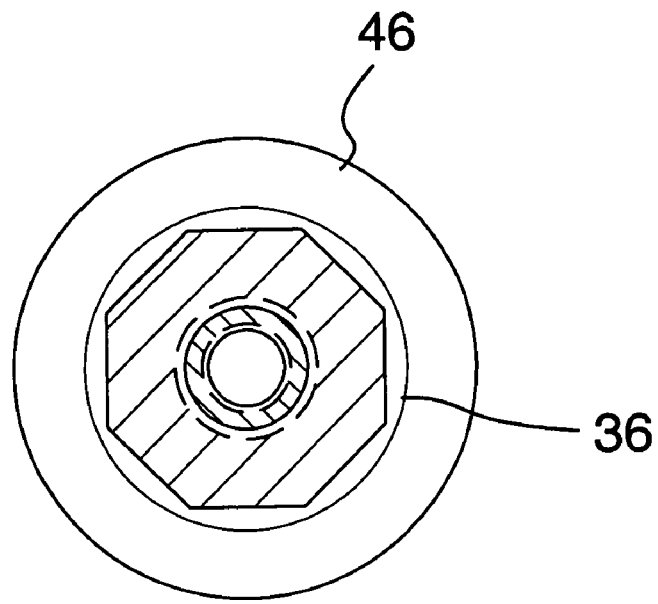
FIG. 4 is a cross-sectional view taken along line 4-4 of FIG. 1 of the present invention.
Figure 5:
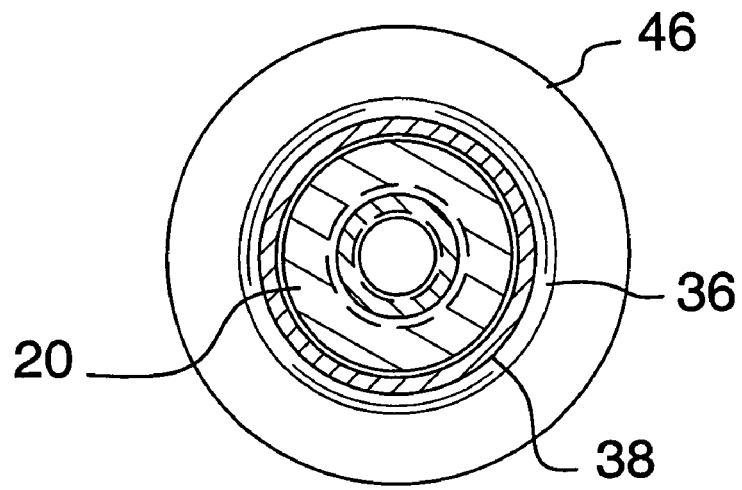
FIG. 5 is a cross-sectional view taken along line 5-5 of FIG. 1 of the present invention.
Figure 6:
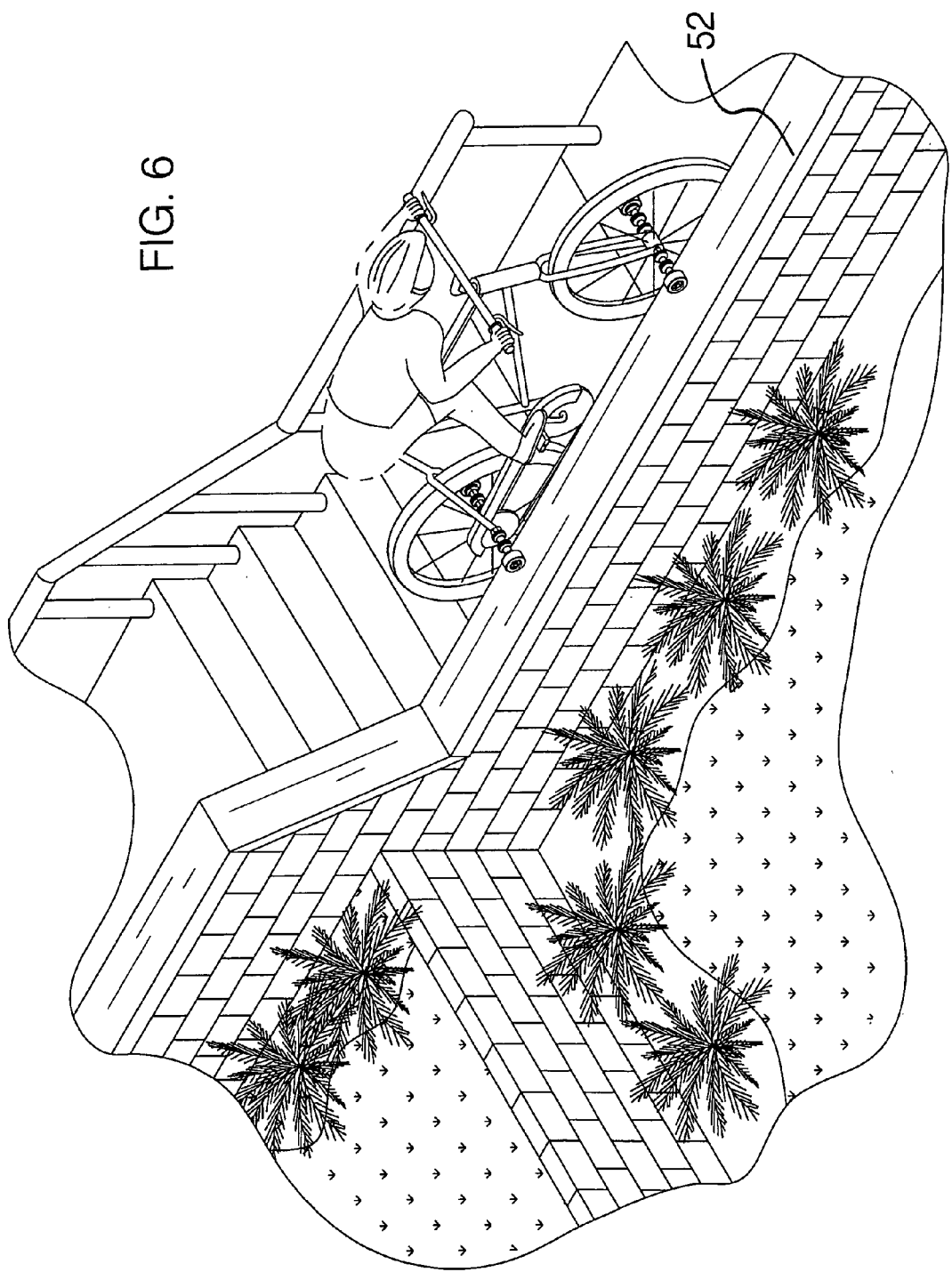
FIG. 6 is a perspective in-use view of the present invention.

With reference now to the drawings, and in particular to FIGS. 1 through 6 thereof, a new bicycle stunt peg embodying the principles and concepts of the present invention and generally designated by the reference numeral 10 will be described.

As best illustrated in FIGS. 1 through 6, the bicycle stunt peg apparatus 10 generally comprises an apparatus that may be mounted on a threaded tire axle 12 of a conventional bicycle 14. The apparatus 10 includes a rod 20 that has a first end 22 and a second end 24. The first end 22 has a threaded well 26 extending therein. The tire axle 12 is extended into and is threadably coupled to the threaded well 26. The rod 20 has a perimeter surface 28 extending between the first 22 and second 24 ends. The perimeter surface 28 has a pair of annular grooves 30 therein. The annular grooves 30 are spaced from each other. Each of the grooves 30 has pair of angled walls 32 and a bottom wall 34. Enlarged portions 36 of the rod 20 bound each of the grooves 30. The angled walls 32 form an angle between 120 degrees and 150 degrees with abutting ones of the enlarged portions 36. The perimeter surface 28 adjacent to the first end 22 has a hexagonal cross-section taken perpendicular to a longitudinal axis of the rod 20 to assist a person in mounting the rod 20 on the threaded tire axle 12. The enlarged portions 36 each have an annular shape taken perpendicular to the longitudinal axis of the rod 20.

A pair of bearings 38 is provided. Each of the grooves 30 has one of the bearings 38 rotatably positioned thereon. An outer diameter of the bearings 38 is less than an outer diameter of the enlarged portions 36. Each of the bearings 38 has a first lateral edge 40 and a second lateral edge 42. The bearings 38 each have an outer surface 44 having a concave arcuate shape between associated ones of the first 40 and second 42 lateral edges.

A wheel 46 is comprised of an elastomeric material. The wheel 46 is rotatably coupled to the second end 24 of the rod 20. A rotational axis of the wheel 46 is approximately co-axial with the longitudinal axis of the rod 20. This may be accomplished by rotatably coupling the wheel 46 to a post 48, which is then extended into and threadably coupled to the second end 24 of the rod 20.

In use, the rod 20 is attached to the bicycle tire axle 12 as described above and shown in FIG. 1. When used to ride on stunt railings 50 or conventional railings, the railing 50 is positioned on one of the bearings 38. Since the bearing 38 rotates as the bicycle 14 is balanced on the rod 20, the rod 20 does not damage the railing 50. To balance the bicycle 14 on a top edge of a wall 52, the wheel 46 may be used and again rotates to prevent damage to the wall 52.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle stunt peg assembly for mounting on a threaded tire axle, said assembly comprising:

a rod having a first end and a second end, said first end having a threaded well extending therein, said tire axle being extended into and being threadably coupled to said threaded well, said rod having a perimeter surface extending between said first and second ends, said perimeter surface having an annular groove therein, said groove being bounded by enlarged portions; and a bearing extending around and being rotatably mounted to said groove.

2. The assembly according to claim 1, wherein said groove has pair of angled walls and a bottom wall, said angled walls forming an angle between 120 degrees and 150 degrees with abutting ones of said enlarged portion.

3. The assembly according to claim 1, wherein said perimeter surface adjacent to said first end has a hexagonal cross-section taken perpendicular to a longitudinal axis of said rod.

4. The assembly according to claim 1, wherein said enlarged portion has an annular shape taken perpendicular to a longitudinal axis of said rod.

5. The assembly according to claim 1, wherein said bearing has a first lateral edge and a second lateral edge, said bearing having an outer surface having a concave arcuate shape between said first and second lateral edges.

6. The assembly according to claim 2, wherein said bearing has a first lateral edge and a second lateral edge, said bearing having an outer surface having a concave arcuate shape between said first and second lateral edges.

7. The assembly according to claim 1, further including a wheel being comprised of an elastomeric material, said wheel being rotatably coupled to said second end of said rod, a rotational axis of said wheel being approximately co-axial with a longitudinal axis of said rod.

8. The assembly according to claim 5, further including a wheel being comprised of an elastomeric material, said wheel being rotatably coupled to said second end of said rod, a rotational axis of said wheel being approximately co-axial with a longitudinal axis of said rod.

9. A bicycle stunt peg assembly for mounting on a threaded tire axle, said assembly comprising:

a rod having a first end and a second end, said first end having a threaded well extending therein, said tire axle being extended into and being threadably coupled to said threaded well, said rod having a perimeter surface extending between said first and second ends, said perimeter surface having a pair of annular grooves therein, said annular grooves being spaced from each other, each of said grooves having pair of angled walls and a bottom wall, each of said grooves being bounded by enlarged portions, said angled walls forming an angle between 120 degrees and 150 degrees with abutting ones of said enlarged portions, said perimeter surface adjacent to said first end having a hexagonal cross-section taken perpendicular to a longitudinal axis of said rod, said enlarged portions having an annular shape taken perpendicular to said longitudinal axis;

a pair of bearings, each of said grooves having one of said bearings rotatably positioned thereon, each of said bearings having a first lateral edge and a second lateral edge, each of said bearings having an outer surface having a concave arcuate shape between associated ones of said first and second lateral edges; and a wheel being comprised of an elastomeric material, said wheel being rotatably coupled to said second end of said rod, a rotational axis of said wheel being approximately co-axial with said longitudinal axis of said rod.

* * * * *